United States Patent
Färber et al.

(10) Patent No.: US 7,136,660 B2
(45) Date of Patent: Nov. 14, 2006

(54) POSITIONAL DETERMINATION OF A USER IN A MOBILE COMMUNICATIONS SYSTEM WITH EMISSION DIVERSITY

(75) Inventors: Michael Färber, Wolfratshausen (DE); Jürgen Hofmann, Merching (DE); Karel Sotek, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/518,598

(22) PCT Filed: Jun. 20, 2003

(86) PCT No.: PCT/EP03/06539
§ 371 (c)(1), (2), (4) Date: Dec. 21, 2004

(87) PCT Pub. No.: WO04/002012
PCT Pub. Date: Dec. 31, 2003

(65) Prior Publication Data
US 2005/0202858 A1    Sep. 15, 2005

(51) Int. Cl.
*H04Q 7/20* (2006.01)

(52) U.S. Cl. ............... 455/456.1; 455/101; 370/395.21

(58) Field of Classification Search ............ 455/456.1, 455/404.2, 502, 67.14, 67.16, 101, 18, 230; 342/357.09, 457; 370/395.21, 508, 519
See application file for complete search history.

(56) References Cited

U.S. PATENT DOCUMENTS

| | | | |
|---|---|---|---|
| 5,952,954 A * | 9/1999 | Beckner | 342/22 |
| 6,011,974 A * | 1/2000 | Cedervall et al. | 455/456.4 |
| 6,128,486 A * | 10/2000 | Keskitalo et al. | 455/422.1 |
| 6,169,903 B1 * | 1/2001 | Dorenbosch et al. | 455/458 |
| 6,198,775 B1 * | 3/2001 | Khayrallah et al. | 375/265 |
| 6,757,267 B1 * | 6/2004 | Evans et al. | 370/334 |
| 6,788,661 B1 * | 9/2004 | Ylitalo et al. | 370/334 |
| 6,847,826 B1 * | 1/2005 | Wesby et al. | 455/502 |
| 2002/0022502 A1 | 2/2002 | Chuberre et al. | |
| 2003/0128677 A1 | 7/2003 | Hans et al. | |

FOREIGN PATENT DOCUMENTS

| | | |
|---|---|---|
| DE | 100 09 150 | 8/2001 |
| DE | 100 31 178 | 1/2002 |
| WO | WO02/11315 | 2/2002 |

OTHER PUBLICATIONS

Hiramatsu et al., "Transmit Diversity Applied on the CDMA/TDD Cellular Systems", IEEE, May 15, 2000, pp. 1170-1174.

* cited by examiner

*Primary Examiner*—Nick Corsaro
*Assistant Examiner*—Nghi H. Ly
(74) *Attorney, Agent, or Firm*—Staas & Halsey LLP

(57) ABSTRACT

The invention relates to a method for increasing the precision during the determination of system parameters dependent on the propagation delay, e.g. for a positional determination, in a mobile communications system with emission diversity, according to which a subscriber data signal and a reference signal are assigned to a subscriber. The subscriber data signal is emitted by at least two antenna devices on the emission side, whereas the reference signal is emitted exclusively by one antenna device on the emission side. The reference signal is used to precisely determine signal propagation delays, upon which the system parameters depend.

15 Claims, 1 Drawing Sheet

POSITIONAL DETERMINATION OF A USER IN A MOBILE COMMUNICATIONS SYSTEM WITH EMISSION DIVERSITY

CROSS REFERENCE TO RELATED APPLICATIONS

This application is based on and hereby claims priority to PCT Application No. PCT/EP03/06539 filed on Jun. 20, 2003, German Application No. 10227853.9 filed Jun. 21, 2002 and European Application No. 02013828.5 filed Jun. 21, 2002, the contents of which are hereby incorporated by reference.

BACKGROUND OF THE INVENTION

The invention relates to a method for data transmission in a wireless communication system in which a subscriber data signal is emitted on the transmit side by way of at least two antenna devices.

With regard to wireless communication systems, in order to improve the quality of a data transmission so-called "diversity methods", referred to for example as "space diversity methods" or as "polarization diversity methods", are used.

With regard to a space diversity method used on the transmit side, a carrier frequency subscriber data signal to be emitted is delivered as a user data signal to at least two antenna devices which exhibit a difference of several wavelengths between one another and which have the same polarization.

With regard to a polarization diversity method used on the transmit side, the subscriber data signal to be emitted is similarly delivered to at least two antenna devices which however exhibit different polarizations. Typically, two antenna devices are located in a common antenna housing.

Diversity methods can be used both on the transmit side and also on the receive side and serve to enhance the transmission quality by enhancing an observed receive situation.

With regard to wireless communication systems, such as for example in the case of the GSM mobile radio system or in the case of the GERAN mobile radio system, a transmit-side subscriber data signal for example is divided into two partial signals which are then delivered by way of two "carrier units" to two spatially separated antenna devices having the same polarization for emission. Since as a result of their design the carrier units exhibit tolerances in the respective signal paths of the partial signals, the two partial signals are subject to different signal propagation delays in respect of emission. In addition, specific propagation paths having different signal propagation delays and signal attenuations are produced for each individual partial signal in the radio field as a result of multipath propagation.

On the receive side, a superimposition of the individual partial signals takes place with respect to the subscriber signal, whereby a so-called "diversity gain" is achieved in systems engineering terms. On the other hand, a radio cell enlargement or a range extension can be achieved between sender and receiver by way of the diversity gain.

With regard to the receiver on the other hand, the different propagation paths should be taken into consideration in an appropriate manner, which implies an increased complexity on the part of the receiver.

With regard to mobile radio systems, such as for example in the case of the GSM mobile radio system, a positional determination (location service) is carried out for the subscriber during a data transmission between a mobile subscriber and a base station, using the so-called "Timing Advance Mechanism, TA" for example. In this situation, signal propagation delays for a reference signal are determined during the data transmission between subscriber and base station and these are used to ascertain the position of the subscriber.

Inaccuracies in the positional determination can be attributed directly to inaccuracies occurring whilst determining the signal propagation delay of the reference signal.

With regard to the GSM mobile radio system, by using the TA mechanism it is possible to realize positional determinations having an accuracy of about 200 meters, whereby in addition to the TA mechanism further standardized methods such as Assisted GPS (A-GPS), Enhanced Observed Time Difference (E-OTD) and Cell ID Timing Advance (CITA) are known for positional determination.

A positional determination can be carried out with a required level of accuracy in respect of a diversity method executed on the transmit side only with a high resource requirement, or cannot be carried out at all, as a result of the multipath propagation and the different signal propagation delays in the respective carrier units.

Corresponding problems occur for runtime dependent or runtime critical system parameters or system properties in respect of the data transmission, for example in the case of a "synchronized handover" or a "pseudo-synchronized handover".

A so-called hybrid transmit diversity method for transmission of adjacent, successive time slots is known from WO 02/11315 A2. In this situation, information is transmitted from a base station to a mobile terminal X during a first time slot with the aid of a so-called "Delay Diversity" method, while information is transmitted to a further mobile terminal Y with the aid of a so-called "Space Time Diversity" method.

A base station having a plurality of transmit antennas is known from US 2002/0022502 A1. In this situation, a unidirectional channel is transmitted either by a first antenna or by a second antenna. The switchover between the two antennas takes place with the aid of a predetermined random selection.

Different transmit diversity methods for a CDMA-TDD wireless communication system are known from "Transmit Diversity Applied on the CDMA/TDD Cellular Systems", Hiramatsu et al, VTC 2000-Spring. 2000 IEEE 51st Vehicular Technology Conference Proceedings, Tokyo, Japan, May 15–18, 2000, Vol. 2 OF3, pp. 1170-1174, XP000968054. In this situation, for example the physical synchronization channel PSCH is transmitted by a "Time Switched Transmit Diversity" method in which the PSCH is emitted in alternate succession by way of two antennas. The Primary Common Control Channel P-CCPCH is transmitted by a "Block Space Time Transmit Diversity" method in which the P-CCPCH is fed simultaneously to two antenna branches, whereby a separate coding occurs in each antenna branch and the signals differing in their coding are emitted simultaneously by way of two antennas. The Dedicated Physical Channel DPCH is transmitted by a "Selective Transmit Diversity and Transmit Adaptive Antennas" method in which the DPCH is emitted simultaneously with differing weighting by way of two antennas.

A positional determination method for a subscriber device in a wireless communication system is known from DE 100 31 178 A1. With regard to this method, a distinction is made between time critical data on the one hand and time non-critical data on the other hand, whereby the time critical data is transmitted during a time critical window and the time non-critical data is sent during a time non-critical window. Measurement signals required for positional determination are sent during the time non-critical windows in order not to adversely affect the transmission of time critical information. The time critical information is divided into time slots and transmitted in periodically recurring frames. Reference signal transmission is performed for example only in the case of every n-th frame. Transmission resources are saved as a result.

While it is true that in the case of n=1 where a reference signal transmission to an observed subscriber occurs in each frame a positional determination for example would be extremely precise, a reliable wireless delivery to the subscriber would however become uncertain as a result of the constant loss of the diversity gain.

SUMMARY OF THE INVENTION

When a positional determination is carried out using a timing advance mechanism, then the reference signal is delivered for emission by way of one single antenna device, as a result of which ambiguities in the signal propagation delay measurement for the reference signal are reduced with regard to the receiver.

In wireless communication systems employing time division multiple access methods, the reference signal is transmitted in a time slot, whereby this time slot or the burst used for the transmission can be defined specifically for each wireless communication terminal device manufacturer.

In order to be able transmit manufacturer specific reference signals for different manufacturers at the corresponding time slot position, the reference signals are stored on the transmit side—for example in the base station—in manufacturer specific form in a table and can be called down. By this means it is possible for terminal devices from different manufacturers to be operated in the wireless communication system of a network provider.

A positional determination is performed periodically or at time intervals selected at random.

With regard to the GSM mobile radio system or the GERAN mobile radio system, the reference signal is preferably transmitted with the aid of the so-called SCCH channel which is repeated in every tenth frame. An extended training sequence of an SCH time slot being used for synchronization is used as the reference signal.

A time slot being used for synchronization is used by mobile terminal devices of adjacent cells for so-called "monitoring", whereby an adjacent cell terminal device decodes the user information of the SCH channel in the IDLE frame. Through the operator code contained in the user information the adjacent cell terminal device recognizes whether or not it is permitted to access the associated cell of the SCH channel. By periodically deactivating the transmit diversity method in only every n-th frame, this ensures that adjacent cell terminal devices are able to observe the supply area of the cell assigned to the SCH channel in an appropriate manner.

A positional determination is then carried out for example in the case of every hundredth frame with the aid of a so-called "Location Measurement Unit, LMU" which is now already normally available as a module in every base station. As an additional function, the LMU has an a priori knowledge of the frames to be used for positional determination, or of their frame numbers. A communication terminal device of a subscriber determines propagation delays for the reference signal and reports these back to the base station, whereby tolerances relating to the positional determination are reduced by repeated measurements.

In an advantageous embodiment the reference signal of a subscriber is emitted alternately by way of the at least two antenna devices and a receive-side assessment of the measured reference signal propagation delays takes place for each antenna device used. In the best case, the smallest reference signal propagation delay corresponds to the so-called "line of sight" propagation path. For positional determinations to be additionally performed, the antenna device ascertained in this manner is preferably used for emitting the reference signal.

If more than two antenna devices are used for emission purposes, the probability of detecting the line-of-sight propagation path increases, which results in a possible increase in the accuracy of the positional determination.

In order to check the accuracy of the positional determination, the antenna devices for reference signal emission are alternated from time to time, with a subsequent propagation time assessment.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
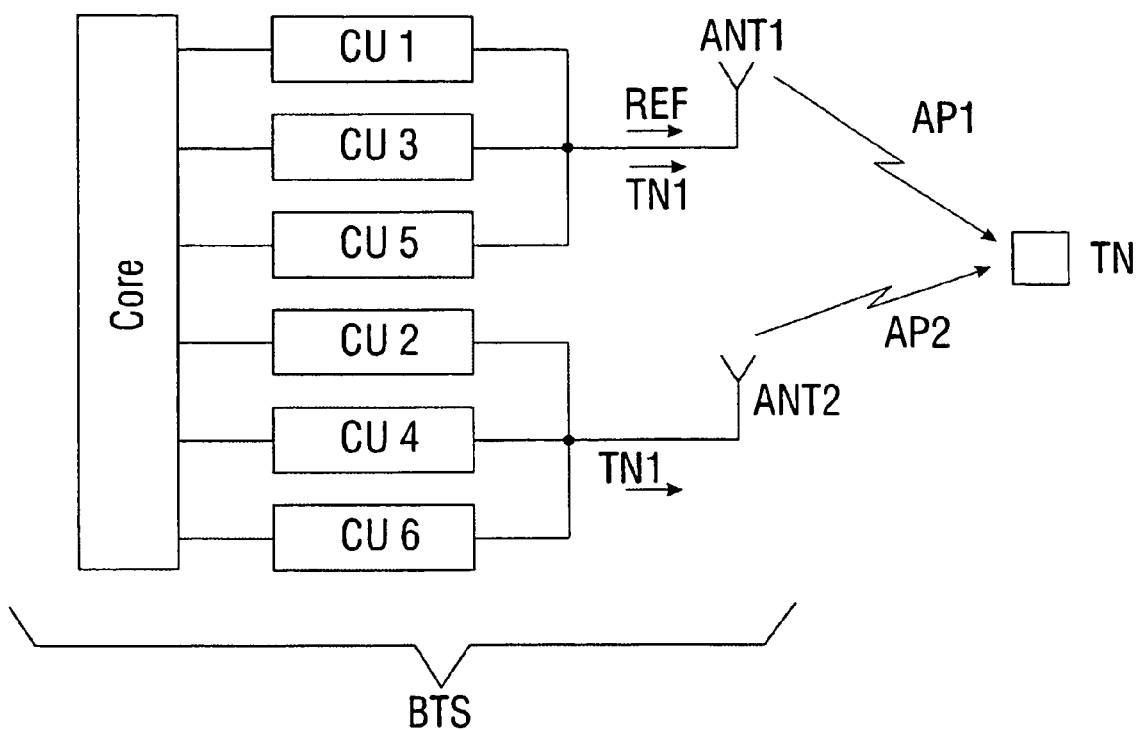
FIG. 1 shows a wireless communication system for executing the method according to one aspect of the invention.

Reference will now be made in detail to the preferred embodiments of the present invention, examples of which are illustrated in the accompanying drawings, wherein like reference numerals refer to like elements throughout.

FIG. 1 shows a wireless communication system for executing the method according to one aspect of the invention.

A base station BTS comprises six carrier units CU1 to CU6 for the transmission of subscriber signals, which receive subscriber signals that are to be transmitted by way of a network core.

A subscriber data signal TN1, which is assigned to a first subscriber TN, is delivered for emission to two antennas ANT1 and ANT2 which are used to implement a transmit diversity method. A reference signal REF, which is similarly assigned to the first subscriber TN, is however only emitted by way of a first antenna ANT1.

The subscriber data signal TN1 and the reference signal REF which are emitted by the first antenna ANT1 are delivered by way of a propagation path AP1 to the subscriber TN, while the subscriber data signal TN1 which is emitted by a second antenna ANT2 is delivered by way of a propagation path AP2 to the subscriber TN.

If in the case of a GSM mobile radio system the reference signal REF is transmitted with the aid of an SCH synchronization channel, then the reference signal REF is emitted alternately by the two antennas ANT1 and ANT2 as follows:

in the case of all even TDMA frames by way of the first antenna ANT1 and in the case of all odd TDMA frames by way of the second antenna ANT2.

A BSS-SMLC then orders signal propagation time measurements which are based on the reference signals REF of the even or odd TDMA frames. The time multiplex signaled by the BSS-SMLC is thus known both with regard to the local measurement unit LMU and also with regard to the mobile subscriber TN.

The BSS-SMLC then evaluates the signal propagation delays for the respective propagation paths AP1 and AP2 and selects that propagation path for future positional determinations which with a small signal propagation delay best corresponds to a direct propagation path (line-of-sight criterion).

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A method for data transmission in a wireless communication system, comprising:
   emitting a subscriber data signal assigned to a subscriber from at least two antenna devices using a diversity method;
   emitting a reference signal assigned to the subscriber from only one of the at least two antenna devices; and
   measuring propagation delay of the reference signal to determine runtime critical system parameters for a positional determination of the subscriber, wherein
   the antenna device used to send the reference signal is switched between the at least two antenna devices
   when the antenna device used to send the reference signal is switched, the propagation delay is compared for the at least two antenna devices, and
   for future propagation delay measurements, the antenna device used to send the reference signal is selected to be the antenna device associated the smaller propagation delay.

2. The method according to claim 1 wherein when the antenna device used to send the reference signal is switched, a comparison is made, and
   for future propagation delay measurements, the antenna device most closely within line-of-sight of the subscriber is selected.

3. The method according to claim 1 wherein the reference signal is selected from a plurality of manufacturer-specific reference signals, and
   the manufacturer-specific reference signals are stored on a transmit side in a table.

4. The method according to claim 1 wherein the at least two antenna devices have polarizations orthogonal to one another.

5. The method according to claim 1 wherein the at least two antenna devices have the same polarization, but are at a fixed distance from one another.

6. The method according to claim 1 wherein the antenna device used to send the reference signal is switched between the at least two antenna devices.

7. The method according to claim 1 wherein the subscriber data signal and the reference signal are transmitted using a time division multiple access method.

8. The method according to claim 7, wherein the reference signal is a training sequence transmitted in a time slot used for synchronization.

9. The method according to claim 8, wherein the wireless communication system is a GSM mobile radio system, and an extended training sequence of a synchronization time slot is used as the reference signal.

10. The method according to claim 1 wherein the positional determination is performed with a timing advance mechanism.

11. The method according to claim 10 wherein the subscriber data signal and the reference signal are transmitted using a time division multiple access method.

12. The method according to claim 11, wherein the reference signal is a training sequence transmitted in a time slot used for synchronization.

13. The method according to claim 12, wherein the wireless communication system is a GSM mobile radio system, and an extended training sequence of a synchronization time slot is used as the reference signal.

14. The method according to claim 13, wherein the reference signal is selected from a plurality of manufacturer-specific reference signals, and
   the manufacturer-specific reference signals are stored on a transmit side in a table.

15. The method according to claim 14, wherein the at least two antenna devices have polarizations orthogonal to one another.

* * * * *